United States Patent Office 2,904,372
Patented Sept. 15, 1959

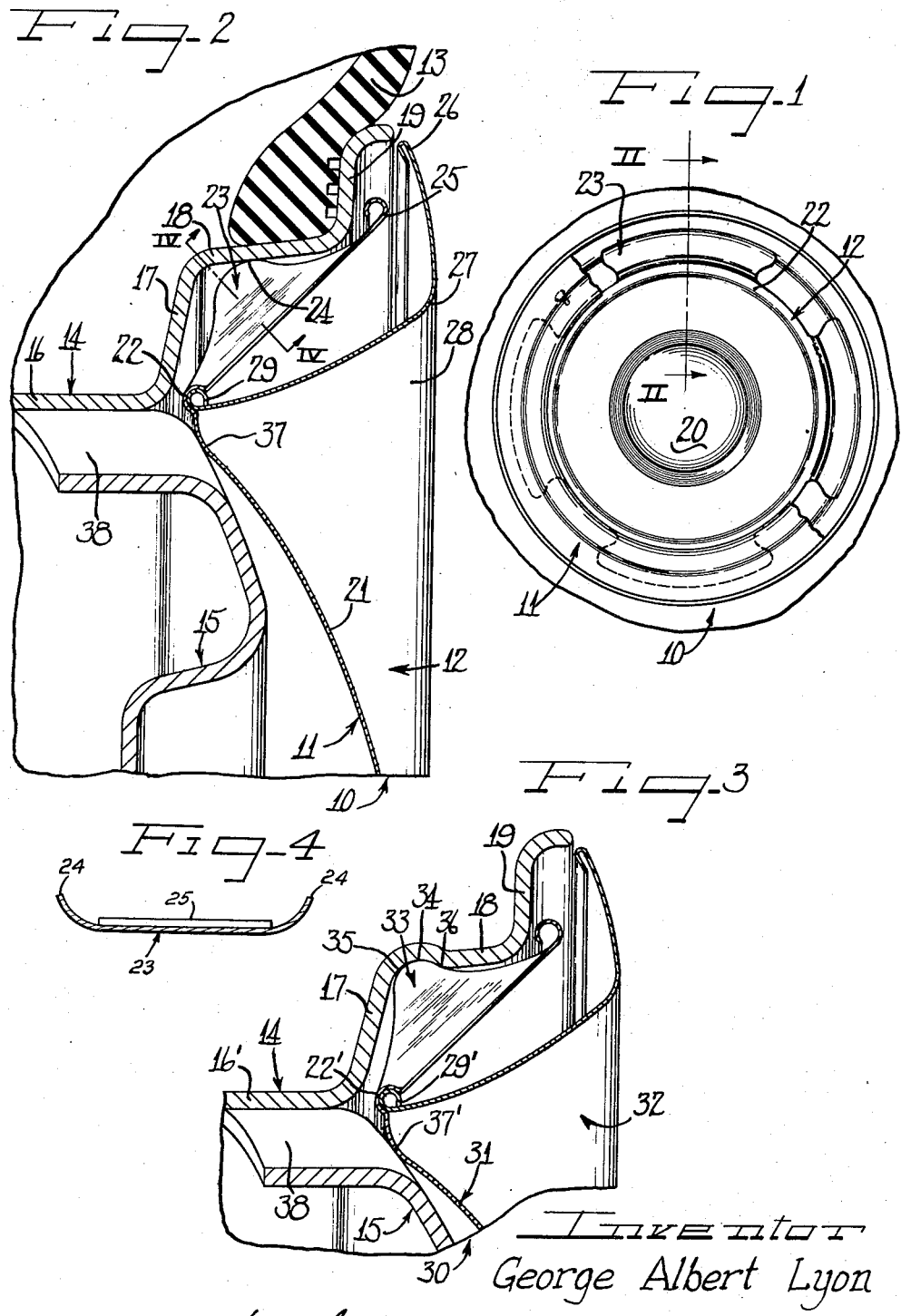

2,904,372

WHEEL COVER

George Albert Lyon, Detroit, Mich.

Application September 23, 1955, Serial No. 536,068

6 Claims. (Cl. 301—37)

This invention relates generally to an ornamental wheel structure and more particularly to a multi-part cover construction having novel retaining means thereon capable of concentrating and directing air flow under the outer margin of the cover through the wheel openings to cool the wheel structure.

In the automobile industry there is at the present time a demand for ornamental wheel structures having means thereon for directing air currents underneath the wheel cover and into the wheel openings. The present invention is particularly directed to providing a structure which can economically meet this end and which lends itself to large production techniques while at the same time maintaining the high level requirements of retaining engagement between the cover and wheel.

Accordingly, an object of this invention is to provide a new and improved highly ornamental multi-part cover construction having novel retaining means thereon capable of directing air to the internal areas of the wheel structure in order to cool same.

Another object of the instant invention relates to the novel manner in which the inner and outer cover members are maintained in assembled relation.

Still another object of this invention relates to the novel manner in which the vane-like retaining elements are formed integral with the inner cover member.

Still other objects of this invention relate to providing a wheel cover capable of being manufactured on a large scale production basis at an economical cost.

According to the general features of this invention there is provided in a wheel cover structure including rim and body parts with circumferentially spaced wheel openings therein and with the rim having a generally axially extending annular flange, a cover including inner and outer cover members with the inner cover member having an annular seat generally at its outer peripheral margin and with circumferentially spaced vane-like retaining elements extending from said margin, each having gripping edges cooperable with the axial rim flange capable of retaining cooperation therewith, said outer cover member including a portion concealing the engagement between said vane-like elements and axial flange having an inner annular terminal capable of snap-on, pry-off engagement with said annular seat to thereby maintain the cover members in assembled relation.

Other objects and features of this invention will more fully appear from the following detailed description taken in conjunction with the accompanying drawing which illustrates several embodiments thereof and in which:

Figure 1 is a fragmentary side view of a wheel equipped with my novel cover;

Figure 2 is an enlarged fragmentary cross sectional view taken substantially on the line II—II of Figure 1 looking in the direction indicated by the arrows;

Figure 3 is an enlarged fragmentary cross sectional view similar to Figure 2 illustrating a modified form of my invention; and Figure 4 is a cross sectional view taken substantially on the line IV—IV of Figure 2 looking in the direction indicated by the arrows.

As shown in the drawing:

My novel wheel cover 10 including inner and outer cover members 11 and 12 is cooperable with the conventional type wheel which includes the usual tire 13 of either the tube or tubeless type carried in the customary way upon a multiflange drop-center type of tire rim 14. This rim 14 is in turn supported in the usual way upon a central dished metallic body part 15 having a central bolt-on flange (not shown) by means of which the wheel can be attached by bolts or cap screws (not shown) to a part on an axle of a wheel.

The tire rim 14 includes an attachment flange 16 which is secured to the body part 15, a generally radially outwardly extending flange 17, a generally axially outwardly extending flange 18, and terminating in a curled generally radially and axially extending flange 19.

Cooperable with the wheel is inner cover member 11 having a relatively small crown 20 (Figure 1) connected to an intermediate generally radially outwardly and axially inwardly extending portion 21 terminating in a curled peripheral margin defining a seat 22.

Integrally attached to the outer peripheral margin 25 at circumferentially spaced intervals are generally radially and axially outwardly extending arched, bowed or U-shaped vane-like retaining elements 23. In the contemplated wheel cover, I have suitably employed four such elements 23 with each element having two circumferentially spaced tire rim engaging surfaces or edges 24.

It will be appreciated that by virtue of the fact that each set of edges 24 are divergently angled to one another, co-rotation of the inner cover member and wheel is insured. Attached to the outer peripheral margin of the elements 23 is a curled pry-off cushioning edge 25.

The outer cover member 12 includes a turned under annular pry-off bead 26 which is connected to an annular convexly configurated intermediate portion 27 which includes a generally radially and axially inwardly extending portion 28 terminating at its inner margin in an annular bead-like extension 29 which is capable of snap-on pry-off engagement in the seat 22 when the inner and outer cover members 11 and 12 are assembled.

The cover members 11 and 12 may be assembled either before or after the inner cover member 11 is mounted on the wheel.

One manner of assembly is to initially center the inner cover member with respect to the annular axial rim flange 18 and thereafter urge the inner cover member axially inwardly with the spaced divergent edges 24 on each of the elements 23 engaging the tire rim 18 in cammed engagement therewith until offset portion 37 is bottomed against the body part 15. The inner cover member is otherwise maintained in spaced relation to the wheel. The offset portion 37 acts as a cushioning element and in addition, provides means for limiting the axial inward disposition of the cover. This action is highly advantageous since axial shocks may be absorbed without permanent damage to the cover and more particularly the retaining means 23.

The outer cover member 12 may be assembled on the inner cover member by first generally centering the inner margin, or terminal extension 29, with the seat 22. Thereafter the outer cover member 12 is urged axially inwardly with the annular extension 29 being progressively cammed radially inwardly along the bottoms of elements 23 until it snaps into retained engagement with the seat 22.

Removal of the cover may be effected through the insertion of a suitable pry-off tool under the annular bead 26 until the tip of the tool is wedged underneath annular bead 25. Upon a slight twisting and levering the cover 10 may then be ejected, more specifically the retaining means 23 may be disengaged from axial flange 18.

In Figure 4 is shown a modified form of my invention and it will be noted that wherever corresponding elements appear the same reference numerals have been again used to identify them.

In this form of my invention the reference numeral 30 indicates generally the cover which includes inner cover member 31 and outer cover member 32.

It will be noted that the cover members 31 and 32 are substantially identical with the cover members 11 and 12 in the first form of my invention with the exception that retaining means or elements 33 are modified over the retaining element 23 construction in the first form of my invention. In this case, arched, bowed or U-shaped vane-like elements 33 each has circumferentially spaced divergent edges 34 which are elongated in a generally radially and axially outwardly extending direction from the corresponding edges in the first form of my invention.

In addition, axial rim flange 18 includes an annular groove 34 having an annular retaining shoulder 36 positioned axially outwardly from the groove. In other words, the tire rim 14 is of the safety groove type.

In the assembly of the inner cover member 31 upon the wheel the edges 34 are progressively flexed along axial flange 18 and are eventually snapped behind annular shoulder 36 into retaining engagement in groove 35. It will be noted that when the inner cover member is assembled on the wheel that the modified cover shown in Figure 4 is bottomed upon body part 15 generally adjacent the junction of the rim and body parts. At the point of junction, the inner cover member is provided with an annular generally axially and radially inwardly offset portion 37'. This offset portion 37' serves to bottom the inner cover member on the wheel while at the same time maintaining the remainder of the inner cover member in spaced cushioned relation to the body part 15.

Outer cover member 32 may be assembled upon the inner cover member 31 in the same manner as in the first form of my invention since inner cover member 31 is provided with an annular seat 22' at its outer margin and outer cover member 32 is provided with an annular bead-like extension 29' capable of snap-on, pry-off engagement therewith.

Removal of the cover 30 from the wheel may be effected in the same manner as was previously described.

In both forms of my invention it will be noted that the outer cover member is adapted to conceal the engagement between the inner cover member and wheel. The retaining elements in both forms serve to hold the cover assembly upon the wheel while at the same time serving as a medium to concentrate and direct air circulated under the outer cover member and more specifically under the free non-engaging edges of the elements 23 into circumferentially spaced wheel openings 38 to cool the structure.

It will be understood that modifications and variations may be effected without departing from the scope of the novel concepts of the present invention.

I claim as my invention:

1. In a wheel structure including rim and body parts with circumferentially spaced wheel openings therein and with the rim having a generally axially extending annular flange, a cover including inner and outer cover members with the inner cover member having an annular seat generally at its outer peripheral margin and with circumferentially spaced vane-like retaining elements extending from said margin, said elements being dished in a radially inwardly axially outwardly direction defining air channels and with each of the retaining elements having resiliently deflectable gripping edges cooperable with the axial rim flange capable of retaining cooperation therewith, said elements acting to funnel air through the wheel openings to promote circulation of air through the wheel, said outer cover member including a portion concealing the engagement between said vane-like elements and axial flange and having an inner annular terminal capable of snap-on, pry-off engagement with said annular seat to thereby maintain the cover members in assembled relation, said outer cover member having its outer margin radially spaced from the rim to allow free air flow between the cover and the wheel.

2. In a wheel structure including rim and body parts with circumferentially spaced wheel openings therein and with the rim having a generally axially extending annular flange, a cover including inner and outer cover members with the inner cover member having an annular seat generally at its outer peripheral margin and with circumferentially spaced vane-like retaining elements extending from said margin, each having gripping edges cooperable with the axial rim flange capable of retaining cooperation therewith, said outer cover member including a portion concealing the engagement between said vane-like elements and axial flange and having an inner annular terminal capable of snap-on, pry-off engagement with said annular seat to thereby maintain the cover members in assembled relation, said outer cover member having an outer peripheral margin in spaced overlying relationship to the rim part and with said vane-like elements being generally bowed in cross section extending generally radially and axially inwardly and thereby defining an air channel linking the associated wheel opening with the space between the peripheral margin of the outer cover member and the tire rim to promote air circulation to cool the wheel.

3. In a wheel structure including rim and body parts with circumferentially spaced wheel openings therein and with the rim having a generally axially extending annular flange, a cover including inner and outer cover members with the inner cover member having an annular seat generally at its outer peripheral margin and with circumferentially spaced vane-like retaining elements extending from said margin, said elements being dished in a radially inwardly axially outwardly direction defining air channels and with each of the retaining elements having resiliently deflectable gripping edges cooperable with the axial rim flange capable of retaining cooperation therewith, said elements acting to funnel air through the wheel openings to promote circulation of air through the wheel, said outer cover member including a portion concealing the engagement between said vane-like elements and axial flange and having an inner annular terminal capable of snap-on, pry-off engagement with said annular seat to thereby maintain the cover members in assembled relation, said outer cover member having its outer margin radially spaced from the outer rim to allow free air flow between the cover and the wheel, said retaining elements each having a portion in close proximity to said seat to provide a lead in camming edge upon which said inner annular terminal is flexed prior to its engagement in said seat.

4. In a wheel structure including rim and body parts with circumferentially spaced wheel openings therein and with the rim having a generally axially extending annular flange, provided with an annular retaining shoulder at the axially inner end of said axial flange, a cover including inner and outer cover members with the inner cover member having an annular seat generally at its outer peripheral margin and with circumferentially spaced vane-like retaining elements extending from said margin, said elements being dished in a radially inwardly axially outwardly direction defining air channels and with each of the retaining elements having resiliently deflectable gripping edges cooperable with the axial rim flange and capable of retaining cooperation therewith, said elements acting to funnel air through the wheel openings to promote circulation of air through the wheel, said outer cover member including a portion concealing the engagement between said vane-like elements and axial flange having an inner annular terminal capable of snap-on, pry-off engagement with said annular seat to thereby maintain the cover members in assembled relation, said outer cover member having its outer margin radially spaced from the rim to allow free air flow between the cover and the wheel, said edges on each of said elements being divergent and extending axially rearwardly into retained engagement behind the retaining shoulder thereby maintaining the cover on the wheel and insuring co-rotation of same.

5. In a wheel structure including rim and body parts with circumferentially spaced wheel openings therein and with the rim having a generally axially extending annular flange, a cover assembly including inner and outer cover members with the inner cover member having a groove defining an annular seat generally at its outer peripheral margin and with circumferentially spaced vane-like retaining elements extending from said margin, said elements being dished in a radially inwardly axially outwardly direction defining air channels and with each of the retaining elements having resiliently deflectable gripping edges cooperable with the axial rim flange for retaining cooperation therewith, said outer cover member having its outer margin spaced from the tire rim to allow free air flow between the cover and the wheel, said elements terminating in a pry-off edge area radially underlying the space between the tire rim and the outer margin whereby a pry-off tool may be inserted underneath the outer margin of the outer cover member and applied against the edge area to release the cover member from the wheel, said outer cover member including a portion concealing the engagement between said vane-like elements and axial flange having an inner annular terminal for snap-on, pry-off engagement in the annular seat to thereby maintain the cover members in assembled relation.

6. In a wheel structure including rim and body parts with circumferentially spaced wheel openings therein and with the rim having a generally axially extending annular flange, a cover including inner and outer cover members with the inner cover member having an annular seat generally at its outer peripheral margin and with circumferentially spaced vane-like retaining elements extending from said margin, each having gripping edges cooperable with the axial rim flange capable of retaining cooperation therewith, said outer cover member including a portion concealing the engagement between said vane-like elements and axial flange and having an inner annular terminal capable of snap-on, pry-off engagement with said annular seat to thereby maintain the cover members in assembled relation, said outer cover member having an outer peripheral margin in spaced overlying relationship to the rim part and with said vane-like elements being generally bowed in cross-section extending generally radially and axially inwardly and thereby defining an air channel, said inner cover member being bottomed against the body part preventing the circulated air from moving radially inwardly between the inner cover member and the body part and allowing a relatively direct air flow through the bowed vane.

References Cited in the file of this patent
UNITED STATES PATENTS

| | | |
|---|---|---|
| 2,600,410 | Lyon | June 17, 1952 |
| 2,600,411 | Lyon | June 17, 1952 |
| 2,705,172 | Lyon | Mar. 29, 1955 |